(12) United States Patent
Katchmart et al.

(10) Patent No.: US 10,276,198 B1
(45) Date of Patent: Apr. 30, 2019

(54) METHOD AND APPARATUS FOR MULTI-CHANNEL SERVO DEMODULATION

(71) Applicant: Marvell International Ltd., Hamilton (BM)

(72) Inventors: Supaket Katchmart, San Jose, CA (US); David Sue-Hong Liaw, Sna Jose, CA (US); Li Zhang, Milpitas, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/849,247

(22) Filed: Dec. 20, 2017

Related U.S. Application Data

(60) Provisional application No. 62/445,661, filed on Jan. 12, 2017.

(51) Int. Cl.
  *G11B 5/596* (2006.01)
  *G11B 11/105* (2006.01)
  *G11B 5/592* (2006.01)

(52) U.S. Cl.
  CPC ........ *G11B 5/59666* (2013.01); *G11B 5/5926* (2013.01); *G11B 5/59688* (2013.01); *G11B 11/10578* (2013.01); *G11B 5/59672* (2013.01); *G11B 5/59683* (2013.01)

(58) Field of Classification Search
  USPC ...................... 360/29, 31–39, 51, 53, 55, 75, 360/77.02–77.11
  See application file for complete search history.

(56) References Cited

U.S. PATENT DOCUMENTS

| | | | | |
|---|---|---|---|---|
| 6,002,542 A * | 12/1999 | Bruccoleri | ......... | G11B 5/59688 360/77.02 |
| 7,133,233 B1 * | 11/2006 | Ray | ........................ | B82Y 10/00 360/67 |
| 7,209,312 B1 * | 4/2007 | Sutardja | ............. | G11B 5/59666 360/77.07 |
| 7,751,144 B1 * | 7/2010 | Sutardja | ............. | G11B 5/59688 360/77.07 |
| 8,023,216 B1 * | 9/2011 | Cheung | .............. | G11B 5/59633 360/51 |
| 8,213,106 B1 * | 7/2012 | Guo | .................... | G11B 5/59688 360/29 |
| 8,891,191 B1 * | 11/2014 | Park | .................. | G11B 20/10222 360/53 |
| 10,068,589 B1 * | 9/2018 | Katchmart | ............. | G11B 5/012 |
| 2005/0013026 A1 * | 1/2005 | Ehrlich | ..................... | G11B 5/09 360/29 |
| 2005/0013027 A1 * | 1/2005 | Ehrlich | ................ | G11B 5/5521 360/29 |
| 2005/0013031 A1 * | 1/2005 | Ehrlich | .............. | G11B 5/59655 360/51 |
| 2007/0211367 A1 * | 9/2007 | Lau | ..................... | G11B 5/59638 360/75 |
| 2010/0123972 A1 * | 5/2010 | Higashino | .......... | G11B 5/59633 360/77.05 |

* cited by examiner

*Primary Examiner* — Tan X Dinh

(57) ABSTRACT

This disclosure describes apparatuses and techniques for multi-channel servo demodulation. Multiple servo demodulation channels enable additional information to be obtained during the self-servo writing process, such as relative positions of multiple read heads and tracking of multiple servo patterns. This additional information enhances accuracy for self-servo writing and can lead to higher recording densities in media drives, and thus more storage with little or no additional cost.

20 Claims, 11 Drawing Sheets

METHOD AND APPARATUS FOR MULTI-CHANNEL SERVO DEMODULATION

CROSS REFERENCE TO RELATED APPLICATIONS

This application claims priority to U.S. Provisional Patent Application Ser. No. 62/445,661 filed on Jan. 12, 2017, the disclosure of which is incorporated by reference herein.

BACKGROUND

Electronic devices provide many services to modern society. These services enable an electronic device to provide entertainment, assist with scientific research and development, and provide many modern-day conveniences. Many of these services use data, which the electronic device stores. This data may include digital media such as books or movies, algorithms that execute complex simulations, personal user data, applications, and so forth. To avoid exceeding data storage limits, it is beneficial to increase the data storage capacity of the electronic device and avoid deleting data, limiting services, or purchasing additional external storage devices.

Many electronic devices use media drives to store data on disks, such as a hard-disk drive. Generally, the data is organized along concentric tracks. Servo data is also written along these concentric tracks enabling the media drive to determine read and write positions on the disk. Conventionally, this servo data is written to the disk using an external, high precision servowriter. However, servowriters are expensive to operate and the servo writing process is time intensive. To address these issues, self-servo writing techniques were developed, which enable the media drive to write the servo data. Typically, the servo data is written based on seed tracks that are pre-written to the disk.

One of the challenges of self-servo writing is that unintentional written-in errors may be re-produced and amplified when successive tracks are written based on the seed tracks. Furthermore, as the density of the concentric tracks increases, the accuracy of the servo data is crucial for enabling the media drive to detect and follow individual concentric tracks. Without accurate servo data, electronic devices may have limited storage capacity.

The background description provided herein is for the purpose of generally presenting the context of the disclosure. Unless otherwise indicated herein, the approaches described in this section are not prior art to the claims in this application and are not admitted to be prior art by inclusion in this section.

SUMMARY

This disclosure describes apparatuses and techniques for multi-channel servo demodulation. Multiple servo demodulation channels enable additional information to be obtained during the self-servo writing process, such as relative positions of multiple read heads and tracking of multiple servo patterns. This additional information enhances accuracy for self-servo writing and can lead to higher recording densities in media drives, and thus more storage with little or no additional cost.

In some aspects, an apparatus is described that includes a media disk, a first read element, a first servo demodulation channel, a second servo demodulation channel, and a storage media controller. The media disk has multiple servo patterns, including a first servo pattern and a second servo pattern. The first read element reads the multiple servo patterns from the media disk and generates multiple waveforms. The multiple waveforms include a first waveform associated with the first servo pattern and a second waveform associated with the second servo pattern. The first servo demodulation channel demodulates the first waveform to produce first servo data and the second servo demodulation channel demodulates the second waveform to produce second servo data. The storage media controller is configured to receive the first servo data and the second servo data effective to track the first spiral servo pattern and the second spiral servo pattern.

In other aspects, a method is described that receives, from a first read element, a first waveform associated with a first servo pattern on a media disk. The first waveform is demodulated to produce first servo data. A second waveform is received from the first read element. The second waveform is based on a second servo pattern on the media disk. The second waveform is demodulated to produce second servo data. The first servo data and the second servo data are provided to a storage media controller effective to track the first servo pattern and the second servo pattern.

In yet other aspects, a System-on-Chip (SoC) is described that includes a first servo demodulation channel, a second servo demodulation channel and a storage media controller. The first servo demodulation channel receives a first waveform from a first read element. The first waveform is associated with a servo pattern on a media disk. The first servo demodulation channel demodulates the first waveform to produce first servo data. The second servo demodulation channel receives a second waveform from a second read element. The second waveform is associated with the servo pattern. The second servo demodulation channel demodulates the second waveform to produce second servo data. The storage media controller receives the first servo data and the second servo data effective to determine a radial position of the first read element and the second read element on the media disk.

This summary is provided to introduce subject matter that is further described below in the Detailed Description and Drawings. Accordingly, this Summary should not be considered to describe essential features nor used to limit the scope of the claimed subject matter.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

This disclosure describes apparatuses and techniques for multi-channel servo demodulation. Multiple servo demodulation channels enable additional information to be obtained that conventional techniques using a single servo demodulation channel were unable to obtain. This additional information can include relative positions of multiple heads and tracking of multiple servo patterns during a same rotation of the media disk. Additionally, multiple servo demodulation channels can increase a signal-to-noise ratio for a position error signal (PES), enabling accurate position determinations. Thus, multi-channel servo demodulation enhances accuracy for self-servo writing and can lead to further increases in recording densities.

The following discussion describes an operating environment, example media drives in accordance with one or more aspects, an example method in accordance with one or more aspects, and a System-on-Chip (SoC) in which components of the operating environment can be embodied. In the discussion below, reference is made to the operating environment by way of example only.

Operating Environment

Figure 1:
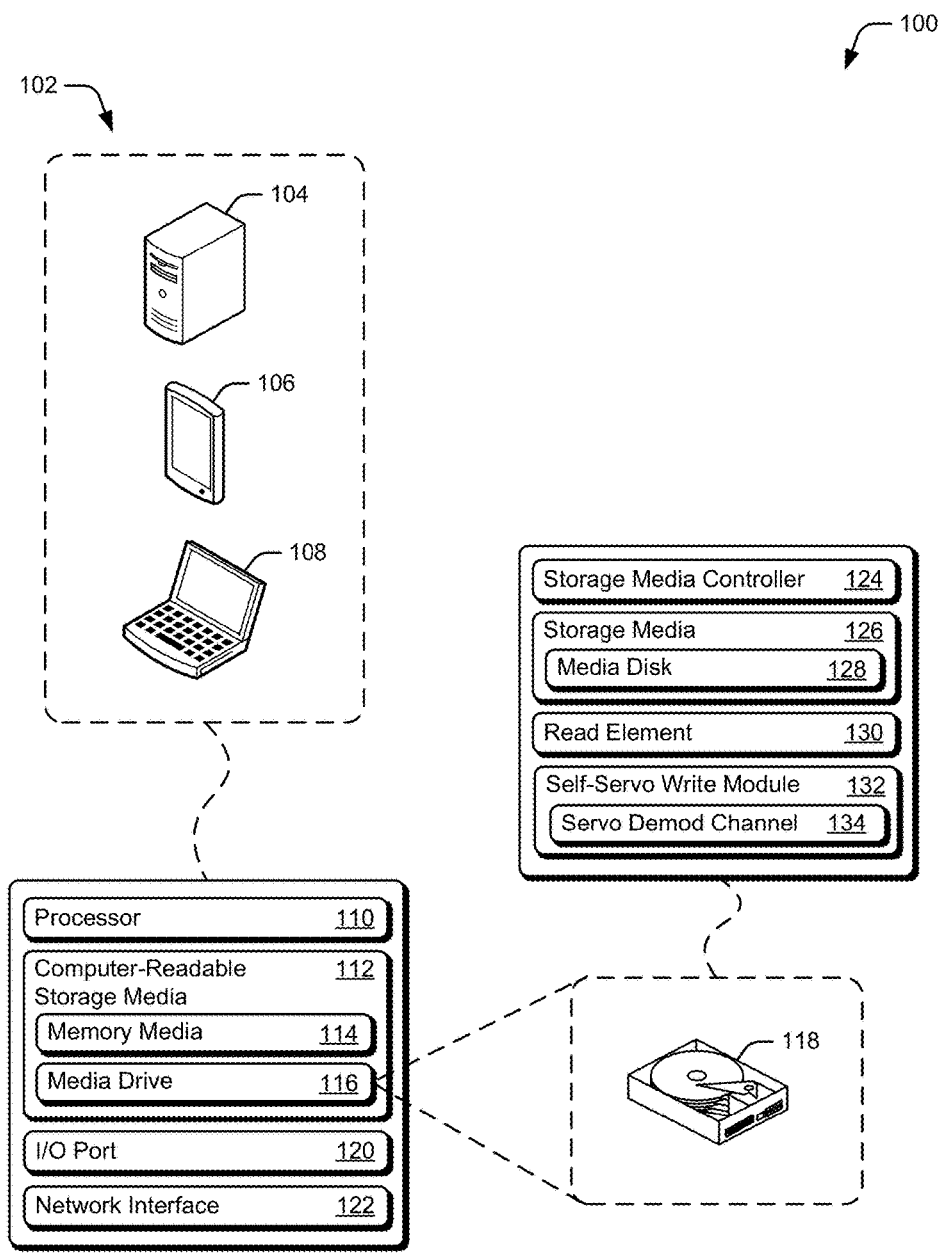
FIG. 1 illustrates an operating environment having an example computing device in accordance with one or more aspects.

FIG. 1 illustrates an example operating environment 100 having a computing device 102, which is capable of communicating and/or storing data. Examples of the computing device 102 include a server 104, a tablet computer 106, or a laptop computer 108. Further examples of the computing device 102 include a desktop computer, a smart phone, a set-top-box, an embedded communication device, a data storage appliance (e.g., network-attached storage), and so on. The computing device 102 is capable of storing various data, such as databases, user data, multimedia, applications, operating systems, and the like. One or more computing devices 102 may be configured to provide remote data storage or services, such as cloud storage, archiving, backup, client services, records retention, and so on.

The computing device 102 includes at least one processor 110 and computer-readable storage media 112. The processor 110 can be any suitable type of processor, either single-core or multi-core, for executing instructions or commands of the operating system or applications of computing device 102. The computer-readable storage media 112 may include any type and/or combination of suitable storage media, such as memory media 114 and media drive 116. The memory media 114 may include memory such as dynamic random-access memory (DRAM), read-only memory (ROM), or Flash memory useful to store data of applications, databases, and/or an operating system of computing device 102. The media drive 116 may include hard-disk drive (HDD) 118 which is capable of storing data, which is described in more detail below.

The computing device 102 may also include at least one I/O port 120 and at least one network interface 122. The I/O port 120 allows the computing device 102 to interact with other devices and/or users. The I/O port 120 may include any combination of internal or external ports, such as audio inputs and outputs, USB ports, Serial ATA (SATA) ports, PCI-express based ports or card-slots, and/or other legacy ports. Various peripherals may be operatively coupled with the I/O port 120, such as human-input devices (HIDs), external computer-readable storage media, or other peripherals.

Network interface 122 provides connectivity to one or more networks and other devices connected therewith. Data communicated over the network interface 122 may be encrypted or unencrypted depending on the environment in which the computing device 102 is operating. The network interface 122 may include wired interfaces, such as Ethernet or fiber optic interfaces for communicating over a local network, intranet, or the Internet. The network interface 122 may also include a wireless interface that facilitates communication over a wireless network, such as a wireless LAN, cellular network, and/or a wireless personal-area-network (WPAN).

The media drive 116, shown herein as the hard-disk drive 118, includes a storage media controller 124 and a storage media 126. Although not shown, other configurations of the media drive 116 are also contemplated such as a solid-state drive, a tape drive, and other storage devices that sequentially access the storage media 126. Generally, the storage media controller 124 enables the computing device 102 to access contents of the storage media 126, such as an operating system, applications, or data for applications or other services. Generally, the storage media controller 124 writes and reads data of the computing device 102 to and from the storage media 126.

The storage media 126 includes at least one media disk 128 for storing data of the computing device 102. The media disk 128 has at least one previously-written servo pattern. The servo pattern includes multiple servo tracks that typically include a high frequency signal interrupted periodically by a sync mark (e.g., sector address mark), which serves as a timing reference for the storage media controller 124. An interval between sync marks is called a frame. The frame can be thought of as a physical separation of the sync marks on the media disk 128 or as a temporal separation of the sync marks during the read process. In some implementations, the media disk 128 includes multiple servo patterns associated with different clocks, as described in further detail below. Each of the multiple servo patterns can have a different number of servo tracks, different frequencies, or different frames. Generally the tracks of the multiple servo patterns are distinct, however, overlaps can occur on the media disk 128. The techniques of multi-channel servo demodulation can be applied to spiral servo patterns, as well as other servo patterns, such as concentric or radial patterns.

The media drive 116 also includes at least one read element 130, at least one self-servo write (SSW) module 132, and at least two servo demodulation channels 134. As described in further detail below, the two servo demodulation channels 134 can be associated with a same self-servo write module 132 or different self-servo write modules 132. The read element 130, the self-servo write module 132, and the servo demodulation channels 134, which are described in reference to FIG. 2, can at least partially implement multi-channel servo demodulation.

Figure 2:
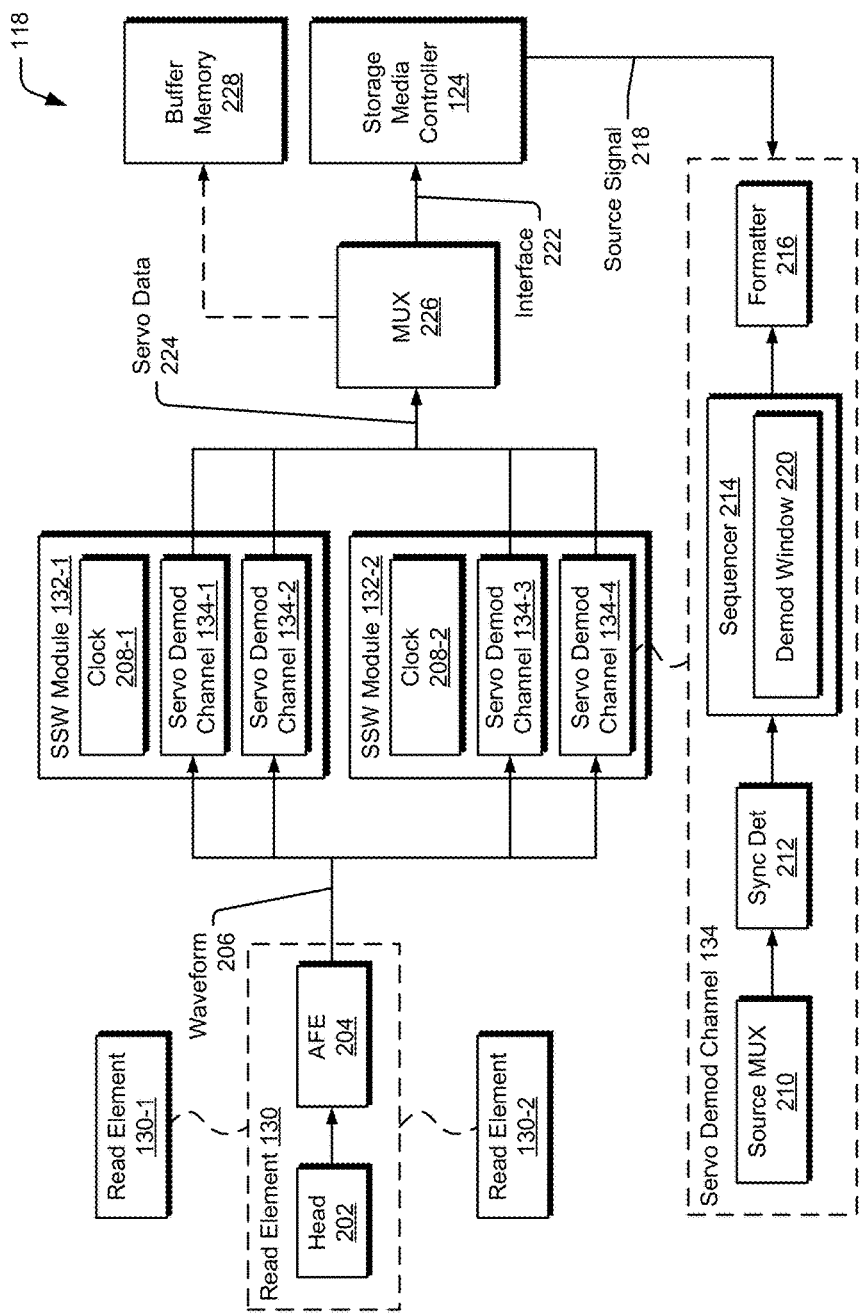
FIG. 2 illustrates an example hard-disk drive of FIG. 1 in accordance with one or more aspects.

FIG. 2 illustrates an example configuration of the hard-disk drive 118 of FIG. 1. The hard-disk drive 118 includes a first read element 130-1 and a second read element 130-2. Generally, each read element 130 includes a head 202 and an analog-front end 204. The head 202 converts magnetic information stored on the media disk 128 to an electrical signal. The analog-front end 204 can include additional components, such as amplifiers, equalizers, filters, and analog-to-digital converters. Using these components, the analog-front end 204 can normalize, filter, and digitize the electrical signal received from the head 202. The head 202 and the analog-front end 204 enable the read element 130 to read one or more servo patterns on the media disk 128 and generate a waveform 206.

The hard-disk drive 118 also includes the self-servo write module 132. The self-servo write module 132 includes a clock 208 and at least one servo demodulation channel 134. The clock 208 enables the servo pattern to be sampled with a correct clock frequency and provides timing for the servo demodulation channels 134 associated with the self-servo write module 132. Accordingly, each self-servo write module 132 is used to demodulate a different servo pattern on the media disk 128. In the depicted configuration, operations of a first self-servo write module 132-1 are based on a first clock 208-1 and operations of a second self-servo write module 132-2 are based on a second clock 208-2. Although not explicitly shown, the clock 208 can be implemented separate from the self-servo write module 132. As an example, a time base generator can act as the first clock 208-1 and a servo frequency generator (SFG) can act as the second clock 208-2.

The first self-servo write module 132-1 includes a first servo demodulation channel 134-1 and a second servo demodulation channel 134-2. The second self-servo write module 132-2 includes a third servo demodulation channel 134-3 and a fourth servo demodulation channel 134-4. Each of the servo demodulation channels 134 can include a source multiplexer (MUX) 210, a synchronous detector 212, a sequencer 214, and a formatter 216. The source multiplexer 210 selects the read element 130 based on a source signal 218 provided by the storage media controller 124. Although not explicitly shown, the servo demodulation channel 134 can be coupled to multiple read elements 130. Thus, the source multiplexer 210 enables the servo demodulation channel 134 to receive one waveform 206 at a time from one of the multiple read elements 130. The synchronous detector 212 demodulates the waveform 206 to produce servo data 224. The demodulation is based on a demodulation window 220, which can be generated by the sequencer 214 from timing information stored in firmware. The demodulation window 220 controls a timing of the demodulation, including a start time and a duration. In general, the demodulation window 220 enables the servo demodulation channel 134 to support different servo patterns and different read elements 130.

In addition to generating the demodulation window 220, the sequencer 214 can control the detection sequence and further customize the detection sequence according to each read element 130 and self-servo write module 132. The sequencer 214 and the formatter 216 further prepare the demodulated servo data 224 for transmission over an interface 222 by respectively controlling a timing and formatting of the servo data 224. In some implementations, the sequencer 214 and the formatter 216 are implemented as a single entity that can service multiple servo demodulation channels 134 associated with a same self-servo write module 132, such as the first servo demodulation channel 134-1 and the second servo demodulation channel 134-2 for the first self-servo write module 132-1.

Multiplexer 226 selects the servo demodulation channel 134 that provides the servo data 224 via the interface 222 to the storage media controller 124. The interface 222 can include one or more interfaces 222 and the multiplexer 226 can pair different interfaces 222 with different servo demodulation channels 134. In some implementations, the number of interfaces 222 may be less than the number of servo demodulation channels 134. In this case, the multiplexer 226 can send a portion of the servo data 224 to a buffer memory 228, which can be accessed by the storage media controller 124.

The storage media controller 124 receives the servo data 224 and can determine additional information based on the servo data 224. As described in further detail below, the storage media controller 124 can use the servo data 224 to determine positions of the multiple read elements 130 and track multiple servo patterns. The storage media controller 124 can also use the additional information to write concentric servo data on the media disk 128.

Multi-channel servo demodulation can be implemented for a variety of media drive 116 configurations, as discussed in further detail below with respect to FIGS. 3-8. The techniques and configurations described below can be extended to other media drive 116 configurations that include any number of read heads 202, servo patterns 402, servo demodulation channels 134, and interfaces 222.

Figure 3:
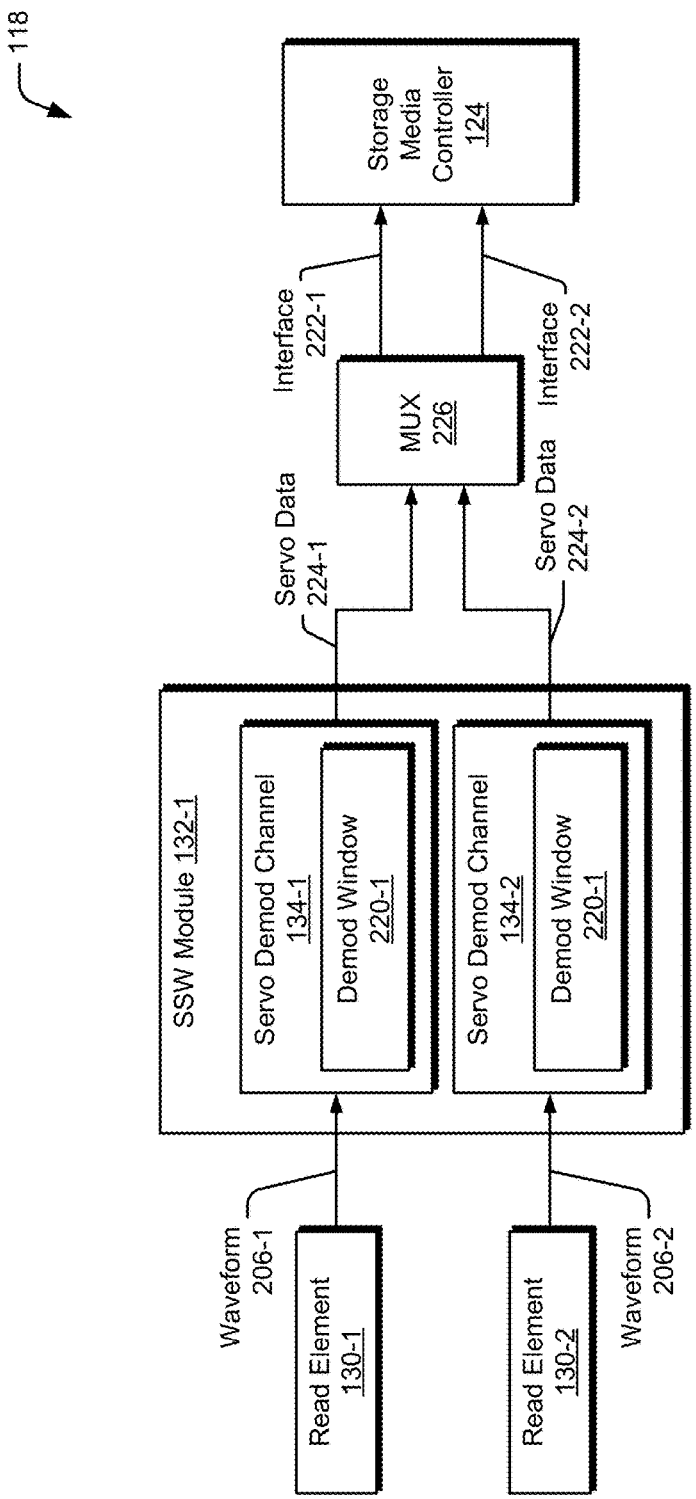
FIG. 3 illustrates an example dual-head single-frequency configuration in accordance with one or more aspects.

FIG. 3 illustrates an example dual-head single-frequency configuration of the hard-disk drive 118 of FIG. 2. The techniques for multi-channel servo demodulation enables the dual-head single-frequency configuration to demodulate a same servo pattern using two read elements 130.

In the depicted configuration, the hard-disk drive 118 includes the first read element 130-1, the second read element 130-2, and the first self-servo write module 132-1 having the first servo demodulation channel 134-1 and the second servo demodulation channel 134-2. Although the first read element 130-1 and the second read element 130-2 can be coupled to the first servo demodulation channel 134-1 and the second servo demodulation channel 134-2, the first read element 130-1 is shown to be coupled to the first servo demodulation channel 134-1 based on the first servo demodulation channel 134-1 selecting the first read element 130-1 and the second read element 130-2 is shown to be coupled to the second servo demodulation channel 134-2 based on the second servo demodulation channel 134-2 selecting the second read element 130-2.

The first servo demodulation channel 134-1 receives a first waveform 206-1 from the first read element 130-1. Based on a first demodulation window 220-1 and the clock 208-1 of the self-servo write module 132-1 (shown in FIG. 2), the first servo demodulation channel 134-1 demodulates the first waveform 206-1 to produce first servo data 224-1. Likewise, the second servo demodulation channel 134-2 receives a second waveform 206-2 and produces second servo data 224-2 based on a second demodulation window 220-2. The multiplexer 226 enables the first servo data 224-1 to be sent to the storage media controller 124 via a first interface 222-1 and the second servo data 224-2 to be sent to the storage media controller 124 via a second interface 222-2. An operation of the dual-head single-frequency configuration is described in further detail with respect to FIG. 4.

Figure 4:
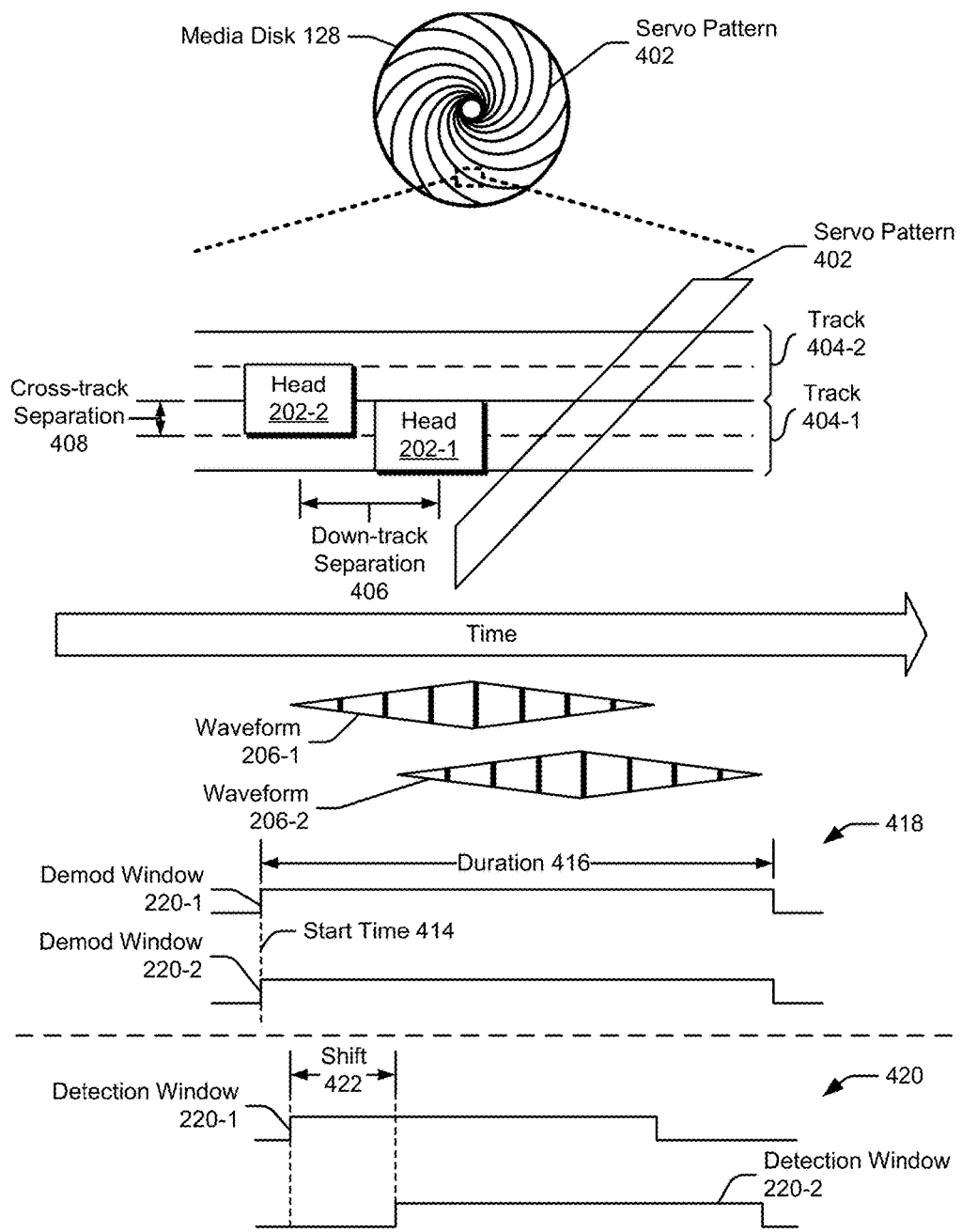
FIG. 4 illustrates an example operation of the dual-head single-frequency configuration of FIG. 3.

FIG. 4 illustrates an example operation of the dual-head single-frequency configuration of FIG. 3. The media disk 128 includes a servo pattern 402 that was previously written to the media disk 128. In some cases, the servo pattern 402 was previously written by the hard-disk drive 118 or via an external servowriter.

The first read element 130-1 includes a first head 202-1 that traverses the media disk 128 along a first concentric track 404-1. The second read element 130-2 includes a second head 202-2 that follows the first head 202-1 at a vertical offset, such as approximately half a track width (e.g., half way between the first concentric track 404-1 and a second concentric track 404-2). A difference in position between the first head 202-1 and the second head 202-2 is characterized by a down-track separation 406 and a cross-track separation 408. In general, a rough estimation of the head geometry is known. However, the head geometry cannot be used to accurately determine the down-track separation 406 and the cross-track separation 408, particularly during operations of the hard-disk drive 118. As the media disk 128 rotates, the first waveform 206-1 and the second waveform 206-2 are generated as the first head 202-1 and the second head 202-2 respectively read one of the tracks of the servo pattern 402.

Based on the first demodulation window 220-1 and the second demodulation window 220-2, the first servo demodulation channel 134-1 and the second servo demodulation channel 134-2 respectively demodulate the first waveform 206-1 and the second waveform 206-2. The demodulation windows 220 are represented in FIG. 4 as digital signals having a high value that enables demodulation and a low value that disables demodulation. Generally, the demodulation window 220 is characterized by a start time 414 and a duration 416. The start time 414 is the time in which the digital signal transitions from the low value to the high value (e.g., the time demodulation starts). The duration 416 is the difference between the start time 414 and the time at which the digital signal transitions from the high value to the low value (e.g., the duration of demodulation). Additional margin can be applied to the start time 414 and the duration 416 to account for timing inaccuracies or variations.

In some implementations, the first demodulation window 220-1 and the second demodulation window 220-2 are similar and have a same start time 414 and a same duration 416, as shown generally at 418. In this case, the first demodulation window 220-1 and the second demodulation window 220-2 span the time of the first waveform 206-1 and the second waveform 206-2.

In other implementations, the first demodulation window 220-1 and the second demodulation window 220-2 can be customized according to the selected read element 130, as shown generally at 420. In this case, the start times 414 of the first demodulation window 220-1 and the second demodulation window 220-2 are different. In particular, a time shift 422 enables the second demodulation window 220-2 to initiate demodulation at a time the second waveform 206-2 occurs. The time shift 422 can be set to any amount of time, such as one frame, multiple frames, or a fraction of a frame. By customizing the demodulation window 220 for each read element 130, narrower demodulation windows 220 can be used (e.g., demodulation windows 220 having smaller durations 416).

Figure 5:
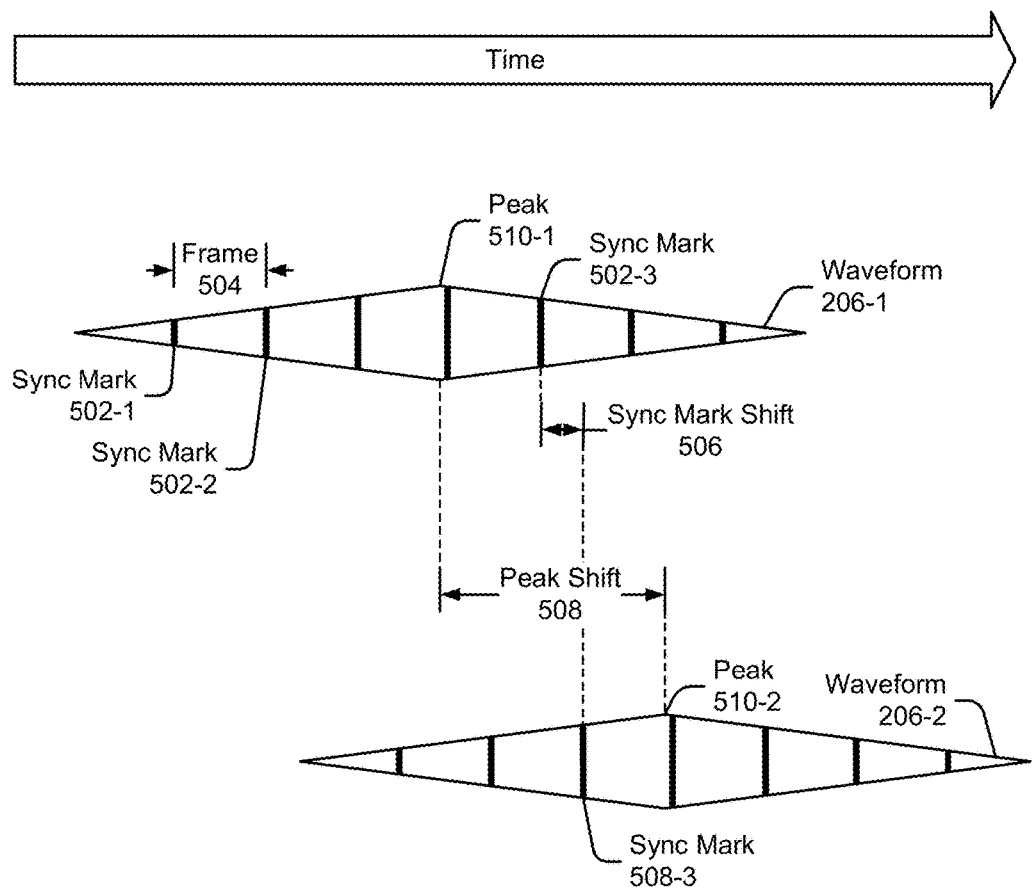
FIG. 5 illustrates example waveforms of the dual-head single-frequency configuration depicted in FIG. 3.

Through the dual-head single-frequency configuration, the down-track separation 406 and the cross-track separation 408 can be accurately measured by the storage media controller 124, as described in further detail with respect to FIG. 5.

FIG. 5 illustrates example waveforms 206 of the dual-head single-frequency configuration of FIG. 3. Each waveform 206 includes multiple sync marks that are read from the servo pattern 402. The sync marks are represented by vertical lines in the first waveform 206-1 and the second waveform 206-2. As an example, the first waveform 206-1 includes a first sync mark 502-1, a second sync mark 502-2 and a third sync mark 502-3. A time interval between sync marks is represented by frame 504.

Due to the cross-track separation 408, the first waveform 206-1 and the second waveform 206-2 may contain same or different sync marks. In the depicted example, the first waveform 206-1 and the second waveform 206-2 include the third sync mark 502-3, and the second waveform 206-2 does not include the first sync mark 502-1 and the second sync mark 502-2. In general, the head geometry enables at least one of the multiple sync marks to be included in the first waveform 206-1 and the second waveform 206-2.

The storage media controller 124 can determine the down-track separation 406 by measuring a sync mark shift 506, which is a time difference between a sync mark that is included in the first waveform 206-1 and the second waveform 206-2. Typically, the sync mark shift 506 is less than a duration of the frame 504. In situations in which the sync mark shift 506 is greater than the duration of the frame 504, additional time offsets can be taken into account to facilitate identification of similar sync marks in the first waveform 206-1 and the second waveform 206-2.

The storage media controller 124 can also determine the cross-track separation 408 by measuring a peak shift 508, which is a time difference between a first peak 510-1 of the first waveform 206-1 and a second peak 510-2 of the second waveform 206-2. In situations in which the peak shift 508 is large (e.g., greater than two frames 504), a time offset can be applied for demodulating the second waveform 206-2.

The dual-head single-frequency configuration enables the storage media controller 124 to accurately determine a position of the first read element 130-1 and the second read element 130-2. By measuring the down-track separation 406 and cross-track separation 408, the position is a relative position of the second read element 130-2 with respect to the first read element 130-1 or vice versa. The dual-head single-frequency configuration also improves signal-to-noise ratio (SNR) for a position error signal (PES) because the same servo pattern is being read and demodulated twice.

Figure 6:
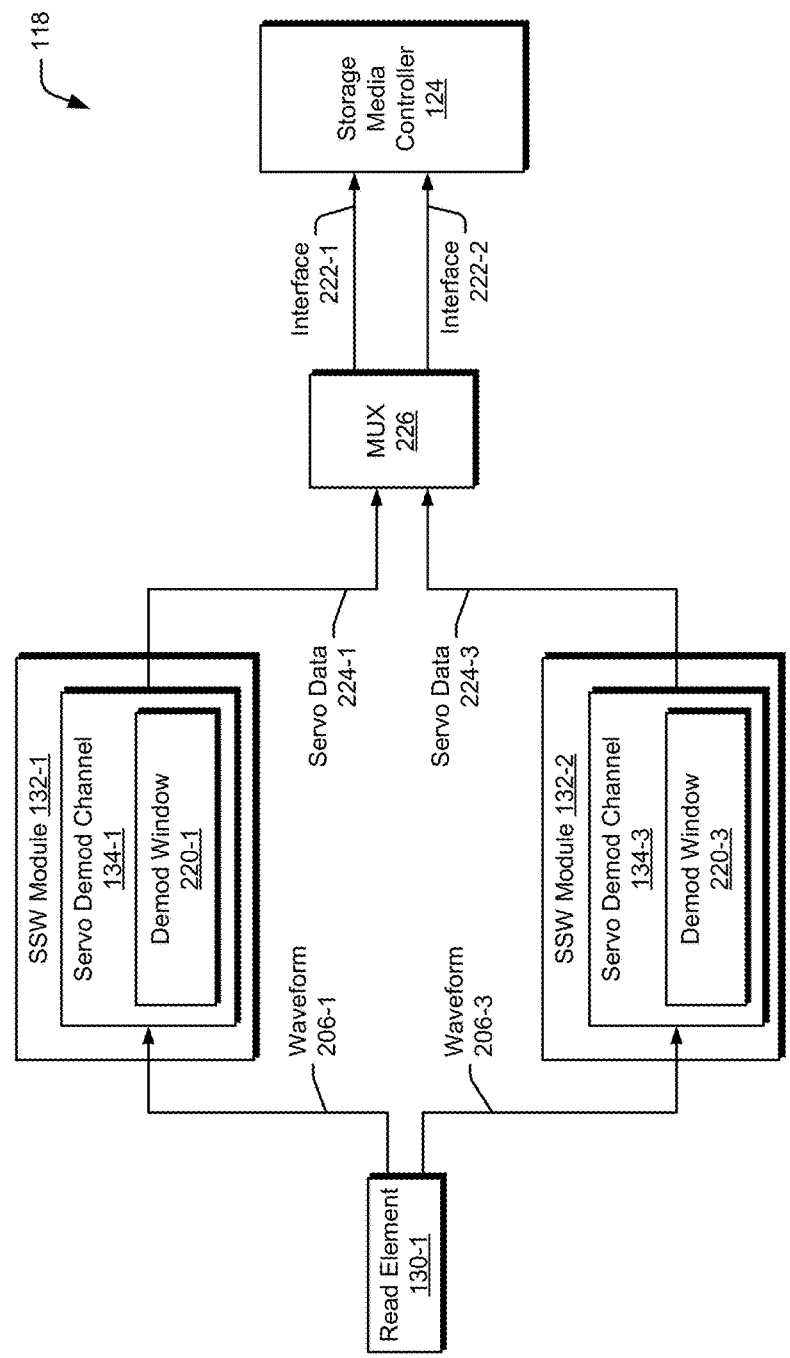
FIG. 6 illustrates an example single-head dual-frequency configuration in accordance with one or more aspects.

FIG. 6 illustrates an example single-head dual-frequency configuration of the hard-disk drive 118 of FIG. 2. The techniques for multi-channel servo demodulation enables the single-head dual-frequency configuration to demodulate two different servo patterns using one read element 130.

In the depicted configuration, the hard-disk drive 118 includes the first read element 130-1, the first self-servo write module 132-1 having the first servo demodulation channel 134-1, and the second self-servo write module 132-2 having the third servo demodulation channel 134-3. The first read element 130-1 generates the first waveform 206-1 and a third waveform 206-3.

The first servo demodulation channel 134-1 receives the first waveform 206-1 from the first read element 130-1 and uses a first demodulation window 220-1. Based on the first demodulation window 220-1 and the clock 208-1 of the self-servo write module 132-1 (as shown in FIG. 2), the first servo demodulation channel 134-1 demodulates the first waveform 206-1 to produce the first servo data 224-1. Likewise, the third servo demodulation channel 134-3 receives the third waveform 206-3 from the first read element 130-1. Using a third demodulation window 220-3, the third servo demodulation channel 134-3 demodulates the third waveform 206-3 and produces the third servo data 224-3 based on the third demodulation window 220-3 and the clock 208-2 of the self-servo write module 132-2 (as shown in FIG. 2). The multiplexer 226 enables the first servo data 224-1 to be sent to the storage media controller 124 via the first interface 222-1 and the third servo data 224-3 to be sent to the storage media controller 124 via the second interface 222-1. An operation of the single-head dual-frequency configuration is described in further detail with respect to FIG. 7.

Figure 7:
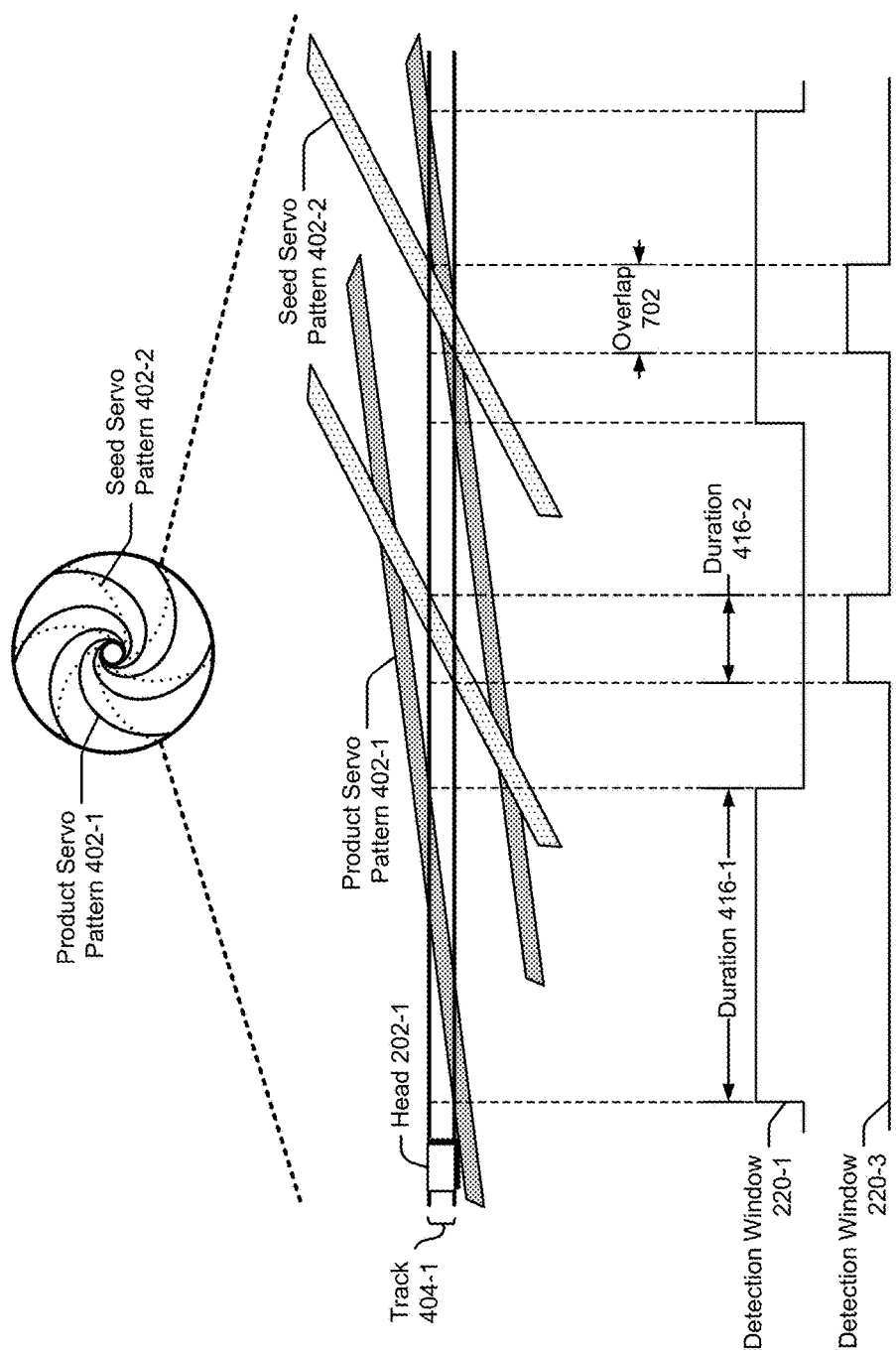
FIG. 7 illustrates example operation of the single-head dual-frequency configuration of FIG. 6.

FIG. 7 illustrates an example operation of the single-head dual-frequency configuration of FIG. 6. The media disk 128 includes multiple servo patterns 402, such as a product servo pattern 402-1 and a seed servo pattern 402-2. The product servo pattern 402-1 can be used to accurately track and write a concentric servo pattern. The seed servo pattern 402-2 is typically used to write the product servo pattern 402-1 and is generally less precise than the product servo pattern 402-1. Typically the product servo pattern 402-1 and the seed servo pattern 402-2 operate at different frequencies and thus, are read and demodulated using different clocks 208. Through the use of one read element 130 and two servo demodulation channels 134 associated with different self-servo write modules 132, the single-head dual-frequency configuration enables multiple servo patterns 402 to be tracked by the storage media controller 124 during a same rotation of the media disk 128.

In the depicted configuration, the first head 202-1 traverses the media disk 128 along the first concentric track 404-1 and enables the first waveform 206-1 to be generated upon reading the product servo pattern 402-1. The first head 202-1 also enables third waveform 206-3 to be generated upon reading the seed servo pattern 402-2. Accordingly, the first detection window 220-1 and the third detection window 220-3 are specified such that the first demodulation channel 134-1 demodulates the product servo pattern 402-1 and the third demodulation channel 134-3 demodulates the seed servo pattern 402-2. In addition to having different start times 414, the first detection window 220-1 and the third detection window 220-3 can also have different durations 416, as shown in FIG. 7.

In some situations, one of the servo demodulation channels 134 may be given priority for accessing read element 130 and receiving the waveform 206. The priority can be applied during time periods in which the product servo pattern 402-1 and the seed servo pattern 402-2 overlap, an example of which is indicated by overlap 702. During the overlap 702, the servo demodulation channel 134 with the higher priority may access the read element 130 while lower priority servo demodulation channels 134 receive noise. As an example, a first priority of the first servo demodulation channel 134-1 is higher than a second priority of the second servo demodulation channel 134-2 because the first servo demodulation channel 134-1 is responsible for demodulating the product servo pattern 402-1.

The single-head dual-frequency configuration enables multiple servo patterns to be detected and tracked by the storage media controller 124. This provides additional information to the storage media controller 124, which improves accuracy for writing concentric servo patterns. For example, the seed servo pattern 402-2 can be used to provide timing information between tracks of the product servo pattern 402-1. Additionally, the overlap 702 can be accurately predicted based on tracking the product servo pattern 402-1 and the seed servo pattern 402-2. Characteristics of the overlap 702 can also be determined, such as a duration of the overlap 702. A trajectory of the product servo pattern 402-1 can also be projected forward across the overlap 702. Many of the advantages of the single-head dual-frequency configuration can also be obtained using a dual-head dual-frequency configuration, as shown in FIG. 8.

Figure 8:
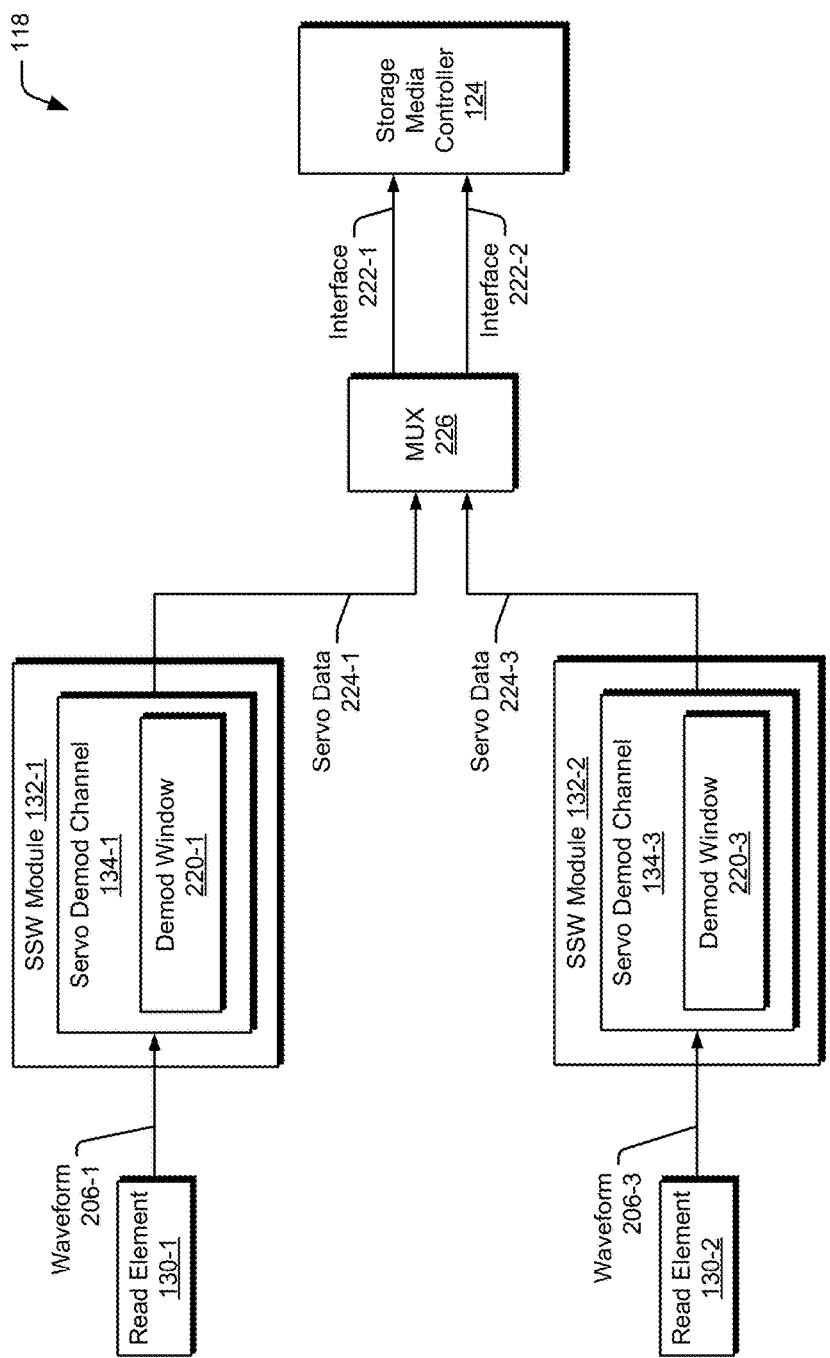
FIG. 8 illustrates an example dual-head dual-frequency configuration in accordance with one or more aspects.

FIG. 8 illustrates an example dual-head dual-frequency configuration of the hard-disk drive 118 of FIG. 2. The techniques for multi-channel servo demodulation enables the dual-head dual-frequency configuration to demodulate two spiral servo patterns using two read elements 130.

The dual-head dual-frequency configuration is similar to the single-head dual-frequency configuration of FIG. 6, except the third waveform 206-3 is provided by the second read element 130-2. In addition to many of the benefits mentioned above with respect to the single-head dual-frequency configuration, the dual-head dual-frequency configuration does not experience a conflict during the overlap 702 because the first servo demodulation channel 134-1 and the third servo demodulation channel 134-1 are accessing waveforms from different read elements 130. In some cases, the dual-head dual-frequency configuration enables the storage media controller 124 to obtain information from the product servo pattern 402-1 and the seed servo pattern 402-2 during the overlap 702.

Figure 9:
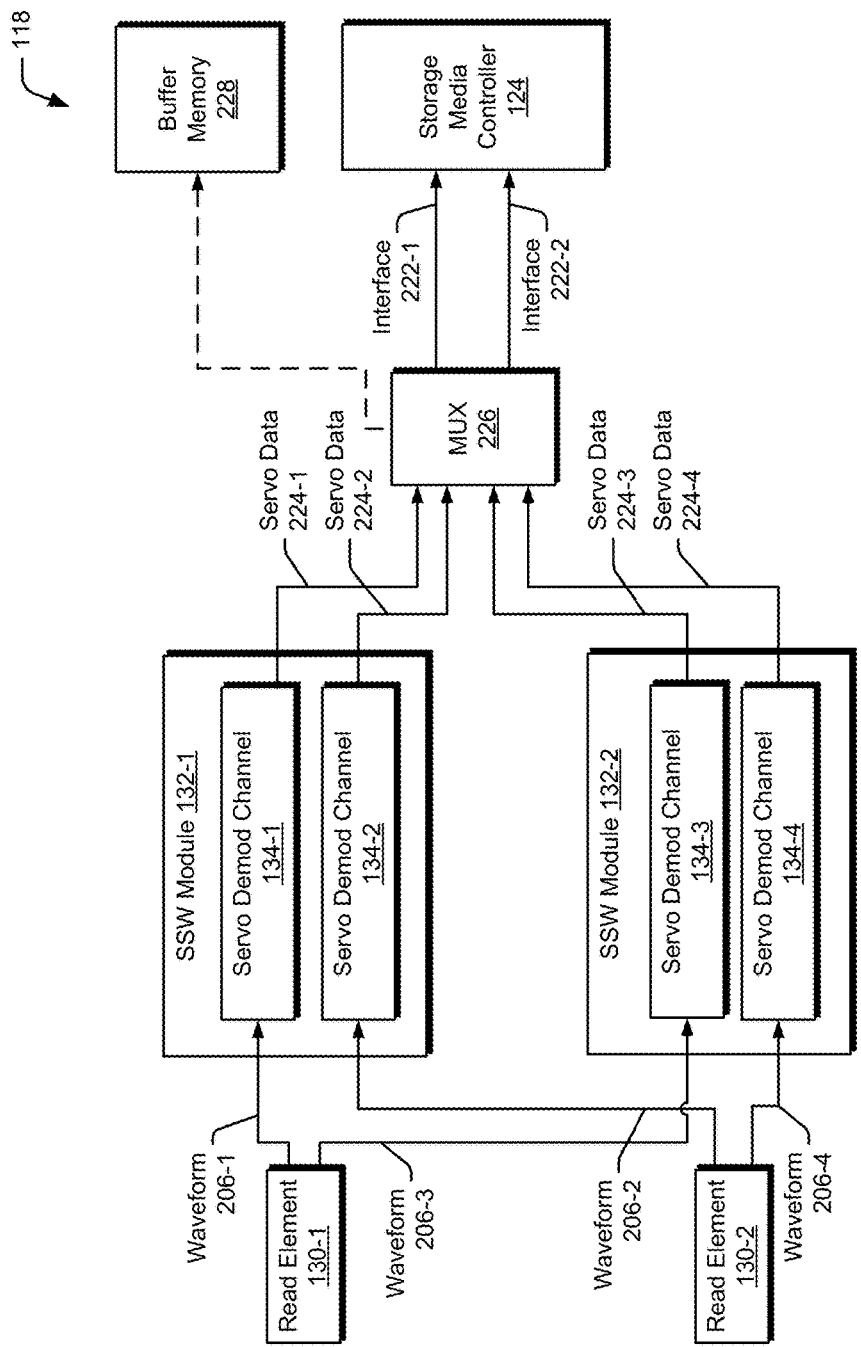
FIG. 9 illustrates another example dual-head dual-frequency configuration in accordance with one or more aspects.

FIG. 9 illustrates another example dual-head dual-frequency configuration of the hard-disk drive 118 of FIG. 2. The techniques for multi-channel servo demodulation enables the dual-head dual-frequency configuration of FIG. 9 to demodulate two servo patterns using two read elements 130 and demodulate a same servo pattern 402 using two read elements 130. In general, the dual-head dual-frequency configuration described in further detail below, merges the dual-head single-frequency configuration shown in FIG. 3 with the single-head dual-frequency configuration shown in FIG. 6.

In the depicted configuration, the first servo demodulation channel 134-1 receives the first waveform 206-1 from the first read element 130-1 and the second servo demodulation channel 134-2 receives the second waveform 206-2 from the second read element 130-2. The first waveform 206-1 and the second waveform 206-2 are associated with the product servo pattern 402-1. The first servo demodulation channel 134-1 and the second servo demodulation channel 134-2 respectively demodulate the product servo pattern 402-1 based on demodulation windows 220 (not shown) and generate the first servo data 224-1 and the second servo data 224-2.

The third servo demodulation channel 134-3 receives the third waveform 206-3 from the first read element 130-1 and the fourth demodulation channel 134-4 receives a fourth waveform 206-4 from the second read element 130-2. The third waveform 206-1 and the fourth waveform 206-4 are associated with the seed servo pattern 402-2. The third servo demodulation channel 134-3 and the fourth servo demodulation channel 134-4 respectively demodulate the seed servo pattern 402-2 and generate the third servo data 224-3 and a fourth servo data 224-4.

In the depicted configuration, there are two interfaces 222 (e.g., the first interface 222-1 and the second interface 222-2) that the multiplexer 226 can enable servo data 224 to be sent over to the storage media controller 124. In this situation, the multiplexer 226 can respectively send the first servo data 224-1 and the third servo data 224-3 across the first interface 222-1 and the second interface 222-2. In contrast, the second servo data 224-2 and the fourth servo data 224-4 can be sent by the multiplexer 226 to the buffer memory.

Figure 10:
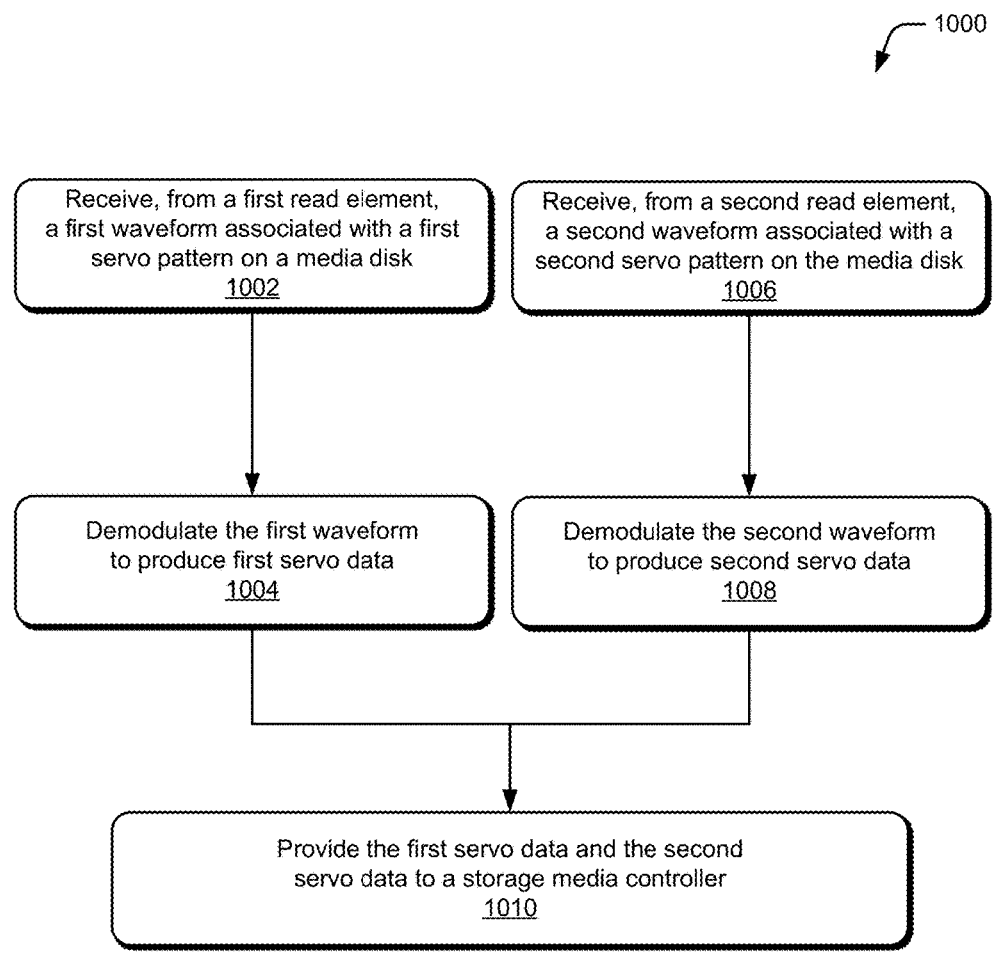
FIG. 10 illustrates an example process flow in accordance with one or more aspects.

FIG. 10 illustrates a process flow 1000 for multi-channel demodulation in accordance with one or more embodiments. For example, the operations of process flow 1000 can be performed by the media drive 116, such as the hard-disk drive 118 of FIGS. 1-3, 6, 8, and 9. The operations of process flow 1000 are not necessarily limited to the order shown and may be used in conjunction with one another, in whole or in part, whether performed by the same entity, separate entities, or any combination thereof. Additionally, the operations can be implemented in connection with any suitable hardware, software, firmware, or combination thereof. In the illustrated and described embodiment, the operations of process flow 1000 can be implemented by any suitably-configured components, an example of which is provided above.

At 1002, a first waveform is received from a first read element. The first waveform is associated with a first servo pattern on a media disk. As an example, the first waveform 206-1 can be provided by the first read element 130-1 and received by the first demodulation channel 134-1, as shown in FIG. 3, 6, 8, or 9. The first demodulation channel 134-1 can include the source multiplexer 210 that selects the first read element 130-1 based on a source signal 218. In some implementations, the first servo pattern is the product servo pattern 402-1 of FIG. 7.

At 1004, the first waveform is demodulated to produce first servo data. For example, the synchronous detector 212 can perform the demodulation using the first clock 208-1. Additionally, the demodulation can include preparing the first servo data 224-1 for transmission over the interface 222 using the sequencer 214 and the formatter 216.

At 1006, a second waveform is received from a second read element. The second waveform is associated with a second servo pattern on the media disk. As an example, the second waveform can be provided by the second read element 130-2 and received by the second demodulation channel 134-2 or the third demodulation channel 134-3, as shown in FIG. 3, 6, 8, or 9. In some implementations, the second servo pattern is the seed servo pattern 402-2, such as in the dual-head dual-frequency configuration. In other aspects, the second servo pattern is a same pattern as the first servo pattern 402-1, such as in the dual-head single-frequency configuration.

At 1008, the second waveform is demodulated to produce second servo data. For example, the synchronous detector 212 can perform the demodulation using the second clock 208-2. Similar to 1004, the demodulation can include preparing the second servo data 224-2 for transmission over the interface 222.

At 1010, the first servo data and the second servo data are provided to a storage media controller. The first servo data and the second servo data can be used by the storage media controller to track the first servo pattern and the second servo pattern, such as in the dual-head dual-frequency configuration. Additionally or alternatively, the first servo data and the second servo data can be used by the storage media controller 124 to determine a position of the second read element 130-2 with respect to the first read element 130-1, such as in the dual-head single-frequency configuration.

The operations of 1002 to 1010 can repeat for additional waveforms as additional tracks corresponding to the first servo pattern or the second servo pattern are read by the first read element or the second read element. Although not explicitly shown, a third waveform associated with the second servo pattern can be received from the first read element and demodulated, such as in the single-head dual-frequency configuration.

System-on-Chip

Figure 11:
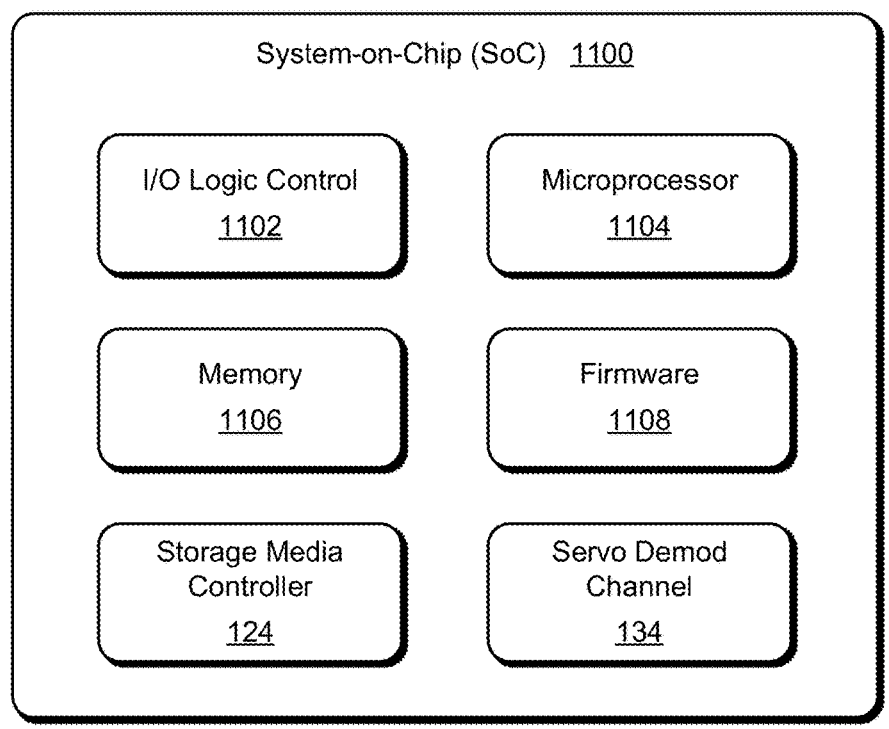
FIG. 11 illustrates a System-on-Chip (SoC) environment in accordance with one or more aspects.

FIG. 11 illustrates a System-on-Chip (SoC) 1100, which can implement various embodiments described above. The SoC 1100 can be implemented in any suitable computing device, such as a video game console, IP enabled television, desktop computer, laptop computer, tablet computer, server, network-enabled printer, set-top box, and/or any other type of device that may employ the media drives 116 for data storage.

The SoC 1100 can be integrated with electronic circuitry, a microprocessor, memory, input-output (I/O) logic control, communication interfaces and components, other hardware, firmware, and/or software needed to provide communicative coupling for a device, such as any of the above-listed devices. The SoC 1100 can also include an integrated data bus or crossbar (not shown) that couples the various components of the SoC 1100 for data communication between the components. A wired or wireless communication device that includes the SoC 1100 can also be implemented with many combinations of differing components. In some cases, these differing components may be configured to implement concepts described herein over various types of wireless connections.

In this example, the SoC 1100 includes various components such as an input-output (I/O) logic control 1102 (e.g., to include electronic circuitry) and a microprocessor 1104 (e.g., any of a microcontroller or digital signal processor). The SoC 1100 also includes a memory 1106, which can be any type of RAM, low-latency nonvolatile memory (e.g., flash memory), ROM, and/or other suitable electronic data storage. The SoC 1100 can also include various firmware and/or software, such as firmware 1108, which can be computer-executable instruction maintained by the memory 1106 and executed by the microprocessor 1104. The SoC 1100 can also include other various communication interfaces and components, communication components, other hardware, firmware, and/or software.

The SoC 1100 includes storage media controller 124 and servo demodulation channel 134. Examples of these various components, functions, and/or entities, and their corresponding functionality, are described with reference to the respective components of the environment 100 shown in FIGS. 1-3, 6, 8, and 9.

Although the subject matter has been described in language specific to structural features and/or methodological operations, it is to be understood that the subject matter defined in the appended claims is not necessarily limited to the specific features or operations described above, including orders in which they are performed.

What is claimed is:

1. An apparatus comprising:
  a media disk having multiple servo patterns including a spiral seed servo pattern and a spiral product servo pattern;
  a first read element configured to:
    read the multiple servo patterns from the media disk; and
    generate multiple waveforms, the multiple waveforms including a first waveform associated with the spiral seed servo pattern and a second waveform associated with the spiral product servo pattern;
  a first servo demodulation channel configured to demodulate the first waveform based on a first clock frequency to produce first servo data;
  a second servo demodulation channel configured to demodulate the second waveform based on a second clock frequency to produce second servo data; and
  a storage media controller configured to receive the first servo data and the second servo data effective to track the spiral seed servo pattern and the spiral product servo pattern.

2. The apparatus of claim 1, wherein the storage media controller is further configured to write concentric servo data on the media disk based on the spiral seed servo data and the spiral product servo data.

3. The apparatus of claim 1, wherein the first read element reads the multiple servo patterns during a same rotation of the media disk.

4. The apparatus of claim 1, wherein:
the first servo demodulation channel demodulates the first waveform based on a first demodulation window, the first demodulation window having a first start time and a first duration; and
the second servo demodulation channel demodulates the second waveform based on a second demodulation window, the second demodulation window having a second start time and a second duration.

5. The apparatus of claim 4, wherein:
the first start time and the second start time are the same; and
the first duration and the second duration are the same.

6. The apparatus of claim 4, wherein:
the first start time and the second start time are different; and
the first duration and the second duration are different.

7. The apparatus of claim 1, wherein the storage media controller is further configured to predict an overlap of the spiral seed servo pattern and the spiral product servo pattern on the media disk based on the first servo data and the second servo data.

8. The apparatus of claim 7, wherein the first demodulation channel has a higher priority than the second demodulation channel effective to enable the first demodulation channel to receive the first waveform when the overlap occurs.

9. The apparatus of claim 1, further comprising:
a second read element configured to:
read one servo pattern of the multiple servo patterns from the media disk; and
generate a third waveform associated with the one servo pattern; and
a third servo demodulation channel configured to demodulate the third waveform to produce third servo data, wherein:
the storage media controller is further configured to receive the third servo data effective to determine a position of the second read element with respect to the first read element.

10. The apparatus of claim 9, wherein:
the one servo pattern corresponds to the spiral seed servo pattern; and
the storage media controller is further configured to:
measure, based on the first servo data and the third servo data, a sync mark shift between the first waveform and the third waveform; and
determine, based on the sync mark shift, a down-track separation between the first read element and the second read element.

11. The apparatus of claim 10, wherein the storage media controller is further configured to:
measure, based on the first servo data and the third servo data, a peak shift between the first waveform and the third waveform; and
determine, based on the peak shift, a cross-track separation between the first read element and the second read element.

12. A method comprising:
receiving, from a first read element, a first waveform associated with a spiral seed servo pattern on a media disk;
demodulating the first waveform based on a first clock frequency to produce first servo data;
receiving, from the first read element, a second waveform based on a spiral product servo pattern on the media disk;
demodulating the second waveform based on a second clock frequency to produce second servo data; and
providing the first servo data and the second servo data to a storage media controller effective to track the spiral seed servo pattern and the spiral product servo pattern.

13. The method of claim 12, further comprising:
receiving, from a second read element, a third waveform associated with the spiral seed servo pattern;
demodulating the third waveform to produce third servo data; and
providing the third servo data to the storage media controller effective to determine a position of the second read element with respect to the first read element.

14. The method of claim 13, wherein:
the first waveform includes a sync mark of the spiral seed servo pattern; and
the third waveform includes the sync mark, and
the method further comprising:
measuring a sync mark shift based on a time difference between the sync mark occurring in the first waveform and the sync mark occurring in the second waveform; and
determining, based on the sync mark shift, a down-track separation between the first read element and the second read element.

15. The method of claim 14, wherein:
the first waveform includes a first peak; and
the second waveform includes a second peak, and
the method further comprising:
measuring a peak shift based on a time difference between the first peak occurring in the first waveform and the second peak occurring in the second waveform; and
determining, based on the peak shift, a cross-track separation between the first read element and the second read element.

16. The method of claim 13, wherein providing the third servo data comprises sending the third servo data to a buffer memory.

17. A System-on-Chip comprising:
a first servo demodulation channel configured to:
receive a first waveform from a first read element, the first waveform associated with a spiral seed servo pattern on a media disk; and
demodulate the first waveform based on a first clock frequency to produce first servo data;
a second servo demodulation channel configured to:
receive a second waveform from a second read element, the second waveform associated with a spiral product servo pattern; and
demodulate the second waveform based on a second clock frequency to produce second servo data; and
a storage media controller configured to receive the first servo data and the second servo data effective to track the spiral seed servo pattern and the spiral product servo pattern.

18. The System-on-Chip of claim 17, further comprising:
a multiplexer configured to:
enable the first servo data to be sent, via a first interface, to the storage media controller; and
enable the second servo data to be sent, via a second interface, to the storage media controller.

19. The System-on-Chip of claim 18, wherein the first servo demodulation channel includes:

another multiplexer configured to select the first read element for receiving the first waveform;
a synchronous detector configured to perform the demodulation; and
a formatter configured to format the first servo data for transmission over the first interface.

20. The System-on-Chip of claim 17, further comprising a third servo demodulation channel configured to:
receive a third waveform from the first read element, the third waveform associated with the spiral product servo pattern; and
demodulate the third waveform based on the second clock frequency to produce third servo data,
wherein the storage media controller is configured to receive the second servo data and the third servo data effective to determine a relative position between the first read element and the second read element on the media disk.

\* \* \* \* \*